United States Patent
Turrini

(10) Patent No.: US 9,045,320 B2
(45) Date of Patent: Jun. 2, 2015

(54) LIFT TRUCK, IN PARTICULAR FOR LIFTING AND STACKING BOATS

(75) Inventor: Claudio Turrini, Castelfranco Emilia (IT)

(73) Assignee: Boat Eagle S.R.I., Bologna (IT)

( * ) Notice: Subject to any disclaimer, the term of this patent is extended or adjusted under 35 U.S.C. 154(b) by 214 days.

(21) Appl. No.: 13/500,841

(22) PCT Filed: Oct. 19, 2010

(86) PCT No.: PCT/IB2010/054727
§ 371 (c)(1),
(2), (4) Date: Apr. 6, 2012

(87) PCT Pub. No.: WO2011/048543
PCT Pub. Date: Apr. 28, 2011

(65) Prior Publication Data
US 2012/0201639 A1  Aug. 9, 2012

(30) Foreign Application Priority Data
Oct. 19, 2009  (IT) ................ PI2009A0129

(51) Int. Cl.
  *B66F 9/065*  (2006.01)
  *B60P 3/10*  (2006.01)
  *B63C 3/06*  (2006.01)
  *B66F 9/075*  (2006.01)
  *B66F 9/08*  (2006.01)

(52) U.S. Cl.
  CPC ............. *B66F 9/0655* (2013.01); *B60P 3/1091* (2013.01); *B63C 3/06* (2013.01); *B66F 9/07545* (2013.01); *B66F 9/07559* (2013.01); *B66F 9/082* (2013.01)

(58) Field of Classification Search
  CPC .. B66F 9/065; B66F 9/07545; B66F 9/07559; B66F 9/082
  USPC ......... 414/634, 663, 664, 785, 700, 708, 718; 180/89.13, 89.16; 280/763.1, 755; 187/222; 296/190.04, 190.05
  See application file for complete search history.

(56) References Cited

U.S. PATENT DOCUMENTS

| 3,398,984 | A | * | 8/1968 | Ajero ...................... 296/190.04 |
| 3,944,277 | A | * | 3/1976 | Cyphert ...................... 296/68 |
| 4,289,442 | A |   | 9/1981 | Stevens |
| 4,822,237 | A | * | 4/1989 | Meyer et al. .................. 414/708 |
| 4,964,778 | A | * | 10/1990 | Muto et al. .................... 414/700 |
| 4,995,469 | A |   | 2/1991 | Mikkelsen et al. |
| 5,106,257 | A | * | 4/1992 | Braud et al. .................. 414/718 |
| 5,577,878 | A | * | 11/1996 | Brown ........................ 414/708 |

(Continued)

FOREIGN PATENT DOCUMENTS

| EP | 1384698 | 1/2004 |
| WO | 2008/051991 | 5/2008 |

*Primary Examiner* — Kaitlin Joerger
(74) *Attorney, Agent, or Firm* — Preston Smirman; Smirman IP Law, PLLC

(57) ABSTRACT

A lift truck, in particular for stacking boats, comprises a self-propelled main frame with wheels which supports at its rear end a pivotable telescopic boom pivotably supporting a lift assembly made of lift forks bound to a telescopic frame. The truck has an operator cab which can be transversally shifted and lifted, longitudinally extensible stabilizers and wheels which can be independently steered up to 90°. The truck of the invention has a better loading capacity and it allows stacking boats in very narrow storage facilities and it is not bulky, lighter and more versatile with regard to trucks of the background art.

9 Claims, 9 Drawing Sheets

(56) References Cited

U.S. PATENT DOCUMENTS

| | | |
|---|---|---|
| 5,641,261 A | 6/1997 | Talbert et al. |
| 6,027,303 A | 2/2000 | Voegeli |
| 6,705,826 B1 * | 3/2004 | Callens .................. 414/686 |
| 6,910,544 B2 * | 6/2005 | Sewell .................. 180/68.4 |
| 7,204,546 B2 * | 4/2007 | Antonetti .................. 296/190.04 |
| 7,222,688 B2 * | 5/2007 | Watanabe .................. 180/89.13 |
| 2004/0210342 A1 * | 10/2004 | Magni .................. 700/245 |
| 2008/0095578 A1 * | 4/2008 | Farber et al. .................. 405/3 |

* cited by examiner

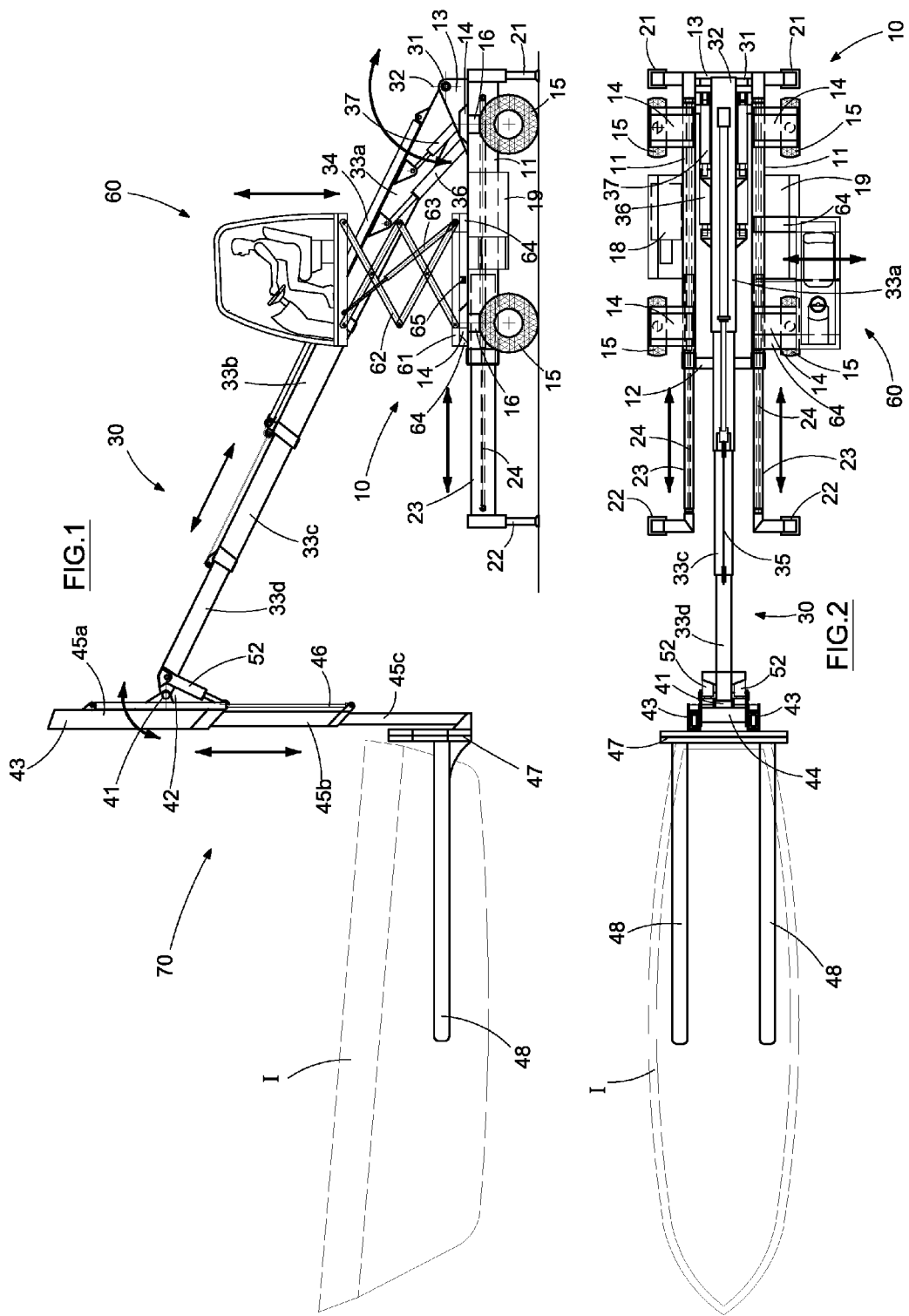

US 9,045,320 B2

LIFT TRUCK, IN PARTICULAR FOR LIFTING AND STACKING BOATS

CROSS-REFERENCE TO RELATED APPLICATION

The instant application is a national phase of PCT/IB2010/054727, filed Oct. 19, 2010, pending, which claims priority to Italian Patent Application No. PI2009A000129, filed Oct. 19, 2009, pending, the entire specifications of both of which are expressly incorporated herein by reference.

TECHNICAL FIELD

The present invention concerns a lift truck, in particular for lifting and stacking boats.

BACKGROUND ART

In the field of boat stacking there is an increasing attention to optimizing storage space. Accordingly, in storage facilities are more and more used racks in which the boats are longitudinally stores with the head on the back side and the stern on the front side, resting side by side and one on top of the other on several levels so that the overall plant dimension of the storage facility is minimized. Still for minimizing the overall dimension two of such rack-like storage facilities face each other with a central passage sized so that lift trucks that have to lift boats from the water, carry them and stack them into their racks are able to run into the passage and to manoeuvre.

As it can be easily guessed the main features required to such vehicles are high loading capacity, stability and easiness of manoeuvring both during lifting and stacking operations and during transporting operations. Obviously, a relevant weight and dimension of this trucks positively affects their loading capacity and stability but it reduces the manoeuvrability, in particular as regards the ability of entering the passage between the racks and inside that passage. Furthermore, a relevant dimension means little versatility as small boats are inefficiently transported with large trucks. Finally, a bulky truck could be not admitted to pass onto some surfaces that have a load limit.

The most common lift truck for lifting and stacking boats comprise a lift assembly made of an upright mast bound to the fore section of the vehicle supporting a pair of forks extending in a fore direction of the vehicle. The forks can be raised and lowered with respect to the ground level so that the truck is able to pick up the boat from the water while it rests on a step floor of a pier or a wharf which usually are one meter or more above the water level. In addiction, the forks can be moved closer or apart each other, so that they fit the shape and dimension of the boat's keel. In the back section of the truck is placed a counterweight intended to balance the weight of the boat. It is easily comprehended that the more is the distance of the counterweight from the fore axis of the truck, the more is the loading capacity of the truck. So, in the above trucks, the more is the size and weight of the boat to be lifted, the more will have to be the size and weight of the truck. Obviously, since the boat is overhanging on front of the truck, the total length during the transport operation, which is substantially the sum of the boat length and the truck length without the forks, is very relevant and it creates problems in manoeuvring the truck and large passages between the racks are needed.

The above problems are at least partially fixed by a vehicle as described in U.S. Pat. No. 6,027,303 A in which a self propelled main frame on wheels comprises a pair of parallel rails extending in a fore-and-aft direction on which slides the lifting assembly mounting the forks, and, together with it, also the operator's cab slides. When the boat has to be picked up from the water the lifting assembly is moved at the fore section of the vehicle while during the transport operation and the stacking operation within the passage between the racks the lifting assembly is kept close to the back section of the vehicle so that the centre of gravity of the boat is comprised between the axis of the for wheels and the axis of the rear wheels and a counterweight is no more needed. In this case the total length during the transport operation is just a little greater than the length of the boat so that a greater manoeuvrability is obtained.

In WO 2008/051991 A it is proposed a lift truck for boats which has a frame structure similar to the one above mentioned and which has additional functions that are able to further increase its manoeuvrability, both concerning the space required for manoeuvring and the visibility during the boat transporting and stacking operations. In fact, this last vehicle is provided with four independently steering wheels having a steering angle of 90° so that the vehicle is able to perform a lateral translation movement which is useful when manoeuvring the truck in the passage between two racks. In addiction, the operator's cab is rotatable about a vertical central axis and it can be also lifted, so that the overall dimensions of the boat can be better perceived by the operator when the boat itself is lifted.

Nevertheless, due to the importance of optimizing the storage space in boat storage facilities it is strongly felt the need of searching solutions of boat stacking trucks that at a same loading capacity have little overall dimensions, that are lighter and that require little space for manoeuvring.

DISCLOSURE OF INVENTION

It is object of the present invention is to propose a lift truck, in particular for stacking boats, that has same loading capacity, high stability, but lower weight and dimensions with respect of the truck of the background art.

It is further object of the present invention to propose a lift truck, in particular for stacking boats, having a high versatility that is it can be efficiently used both for stacking boats that are near the loading capacity of the truck and for stacking smaller and lighter boats.

It is another object of the present invention to propose a lift truck, in particular for stacking boats, that gives the operator great visibility and the best possible operating position thanks to the ability of moving the operator's cab.

The above objects are attained by a lift truck, in particular for stacking boats, comprising:
   a self-propelled main frame with wheels,
   a telescopic boom pivotably connected close to the rear end of said main frame, for pivoting about a substantially horizontal cross-axis with regard to a fore-and-aft direction of said truck, the telescopic boom pivoting from a substantially horizontally laying arrangement to a substantially upright arrangement,
   a lift assembly comprising a pair of lift forks and a telescopic frame supporting said pair of forks, said telescopic frame being pivotably connected at the end of said telescopic boom, for pivoting about a substantially horizontal cross-axis with regard to a fore-and-aft direction of said truck.

The above outlined truck allows loading boats by overhanging them on front its fore end a transporting them with their center of gravity comprised between the axis of the fore wheels and the axis of the rear wheels and, at the same time, it provides a better distribution of the weight of the truck, mainly during the loading and unloading operations.

Advantageously the operator's cab is mounted on said main frame in an external position with regard to the transversal overall dimensions in plant of said main frame, and it is provided with a mechanism for transversally and vertically moving it. It will be better explained in the following that the position and movement ability of the operator's cab allow an optimal visibility for the operator and the truck is so easy to drive in every state.

Still advantageously the frame is provided with stabilizers apt to contact the ground. At least one of the stabilizers is forward extensible up to a definite distance from the front end of said main frame. Thanks to the extensible stabilizers which can be put in action during the loading and unloading operations the total length of the truck can be further reduced, so granting a high versatility and a great manoeuvrability when it is not carrying a boat.

The truck also comprises connection/control means apt to set a relation between the pivoting of said lift assembly around its pivot axis and the pivoting of the telescopic boom around its pivot axis, said control means being apt to keep said pair of lift forks in a substantially horizontally extending arrangement during said pivoting. Further connection/control means apt to set a relation between the pivoting of said telescopic boom around its pivot axis and the extension/retraction movement of the telescopic boom allow performing a substantially horizontal movement of the lift forks upon pivoting the telescopic boom.

BRIEF DESCRIPTION OF DRAWINGS

These and more features and characteristics of the present invention will be more easily comprehensible from the following description of preferred embodiment, given as a non-restrictive example, with reference to the accompanying drawings in which:

FIG. 1 shows a side view of a lift truck according to an embodiment of the present invention;

FIG. 2 shows a top view of the truck of FIG. 1;

BEST MODE FOR CARRYING OUT THE INVENTION

Figure 3:
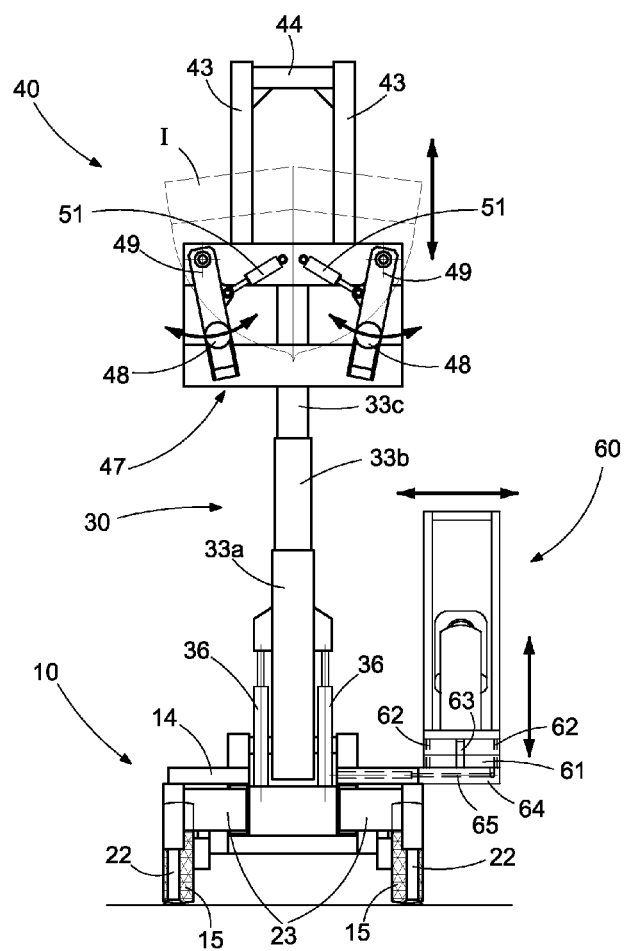
FIG. 3 shows a front view of the truck of FIG. 1 in a different operation state.

These and other variants or modifications may be carried out to the method and apparatus for managing and conditions PV power generation systems according to the invention, still remaining within the ambit of protection as defined by the following claims Referring to FIGS. 1 to 3 a lift truck, in particular for stacking boats, according to the present invention comprises a self-propelled main frame, 10, a telescopic boom, 30, a lift assembly, 40, and an operator cab, 60.

The self-propelled main frame is substantially made of two parallel longitudinal side bars, 11, connected by a fore traverse member, 12, and a rear traverse member, 13, which supports the telescopic boom 30. Four supporting arms, 14, are bound to the side bars 11 for supporting wheels, 15, which are independently steering up to an angle of at least 90° thanks to the fact that they rotate about a vertical axis of the suspension, 16, thereof. An internal combustion engine, 18, is bound to the right side bar between the front and the rear wheels, while in a similar position at the left side there is an hydraulic power system, 19, comprising at least a tank of fluid, an hydraulic control board and the hydraulic pumps thereof. In the rear section of the truck, mounted at the rear end of the side bars 11, there are two stabilizers, 21, which are able of a vertical movement downward directed for contacting the ground. In the fore section of the truck there are two more stabilizers, 22, also able of vertical movement and mounted in sliding arms, 23, housed in a hollow section of the side bars 11, and operated by hydraulic cylinders, 24, also housed inside the side bars 11, so that when moved outward they extend the total length of the main frame.

The telescopic boom 30 is pivotably bound to the rear traverse member 13 through a pivoting support member, 31, whose central axis is an horizontal cross-axis, 32. The telescopic boom 30 is composed of four tubular members, 33a, 33b, 33c, 33d having rectangular section and they are housed almost completely one inside the other in the state of minimum length of the telescopic boom. An hydraulic cylinder, 34, makes the tubular member 33b slide inside the tubular member 33a, and further transmission means, 35, make slide at the same time the tubular members 33c and 33d. Two couples of hydraulic cylinders, 36, 37 rotate the telescopic boom 30 around the pivot axis 32.

The lift assembly 40 is pivotably bound to the end of the tubular member 33d by means of a further pivoting support member, 41, which forms the horizontal cross-axis, 42, for the rotation of the lift assembly with regards to the telescopic boom. The lift assembly comprises a telescopic frame made of telescopic upright members, 43, mutually connected by traverse connection members, 44. The telescopic upright members comprise three lift tubular members, 45a, 45b and 45c having rectangular section and almost completely housed one inside the other in the state of minimum length. Hydraulic cylinders, 46, and further transmission means move the tubular lift members from the lift assembly minimum length state to the lift assembly maximum length state. A fork supporting frame, 47, is bound the tubular lift members 43c, and it supports a pair of forks, 48, extending in the fore direction and pivotably connected to the fork supporting frame 47 for rotating around a horizontal axis according to a known mechanical structure. In fact, thanks to two hydraulic cylinders, 51, the forks 48 rotates around the axis 49 in order to fit their distance to the size of the boat, I, to be lifted. Further hydraulic cylinders, 52, are mounted between the tubular member 33d and the lift assembly 40 for rotating it with regards to the telescopic boom 30.

The operator cab 60 is supported by a platform, 61, to which the operator cab is connected by scissor-like lift means, 62. An hydraulic cylinder, 63, mounted between the operator cab and the platform 62 lifts the cab. The platform 61 is able to slide on transversal guides, 64 which are bound the left side bar and extend outwards from it. A further hydraulic cylinder, 65, moves the platform 61 along the guides 62 so that the cab transversally moves between an inner position in which it is contained in the overall transversal dimension of the truck and an outer position in which it is transversally protruding outwards of a certain amount, for instance in the position shown in FIGS. 2 and 3.

The peculiar features and the way of working of the lift truck, in particular for boats, above outlined will be now described with reference to FIGS. 4 to 10 in which various steps of a boat picking and stacking operation are shown.

Figure 4:
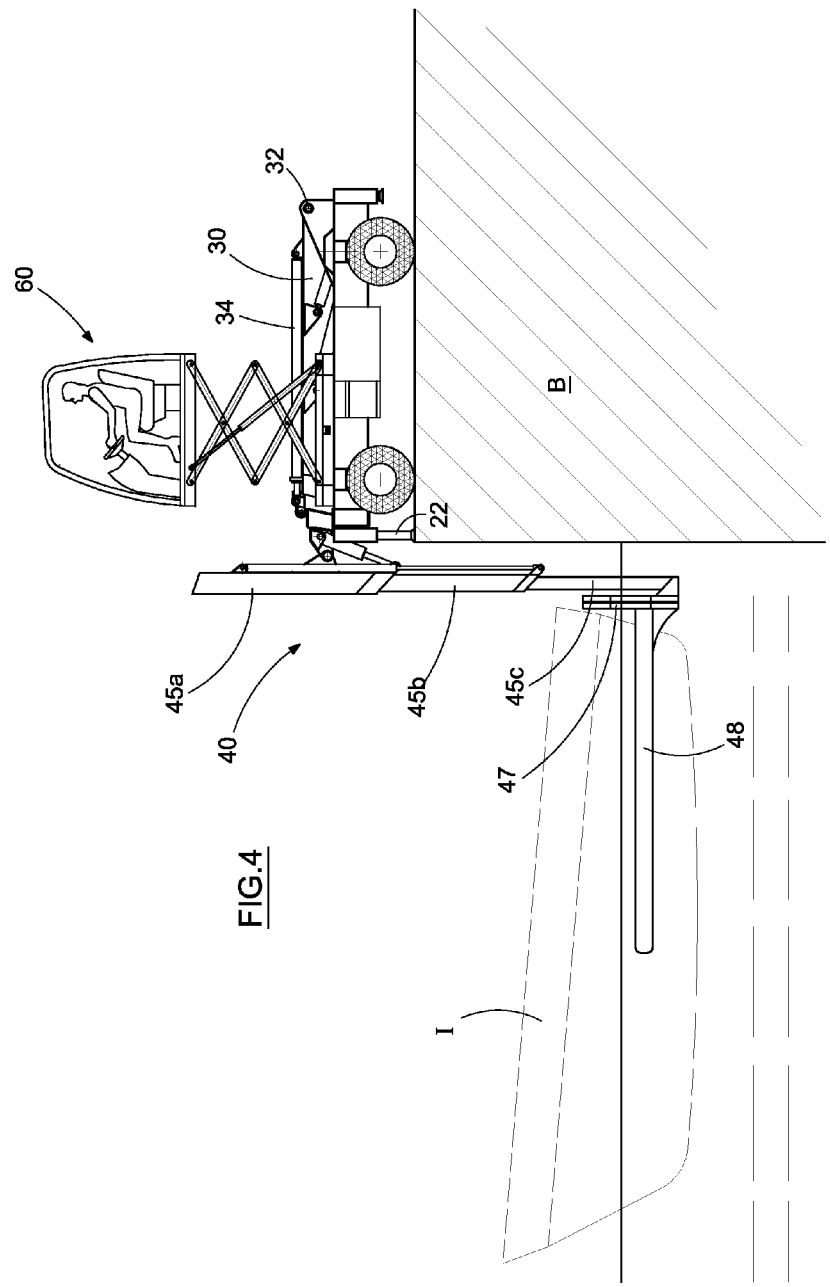
FIGS. 4 to 10 show the truck of FIG. 1 in various operation states concerning specific operation steps.

In FIG. 4 it is shown the truck while it is picking up a boat I from the water level. The truck is parked at the border of the pier, B, with its fore stabilizers 22 lowered. The telescopic boom 30 is horizontal in the state of minimum length. In this state the lift assembly 40 is placed just in front of the truck and it hangs outside the border of the pier. The tubular lift members 45*b* and 45*c* are then extended downwards so that the forks goes under the water level and pass underneath the keel of the boat I. Obviously, in this step the distance between the forks is adjusted by means of the hydraulic cylinders 51 so that it fits to the size of the boat. Still in this step the cab 60 is kept at a lifted position so that the operator is able to better seeing the forks 48 and the boat.

Figure 5:
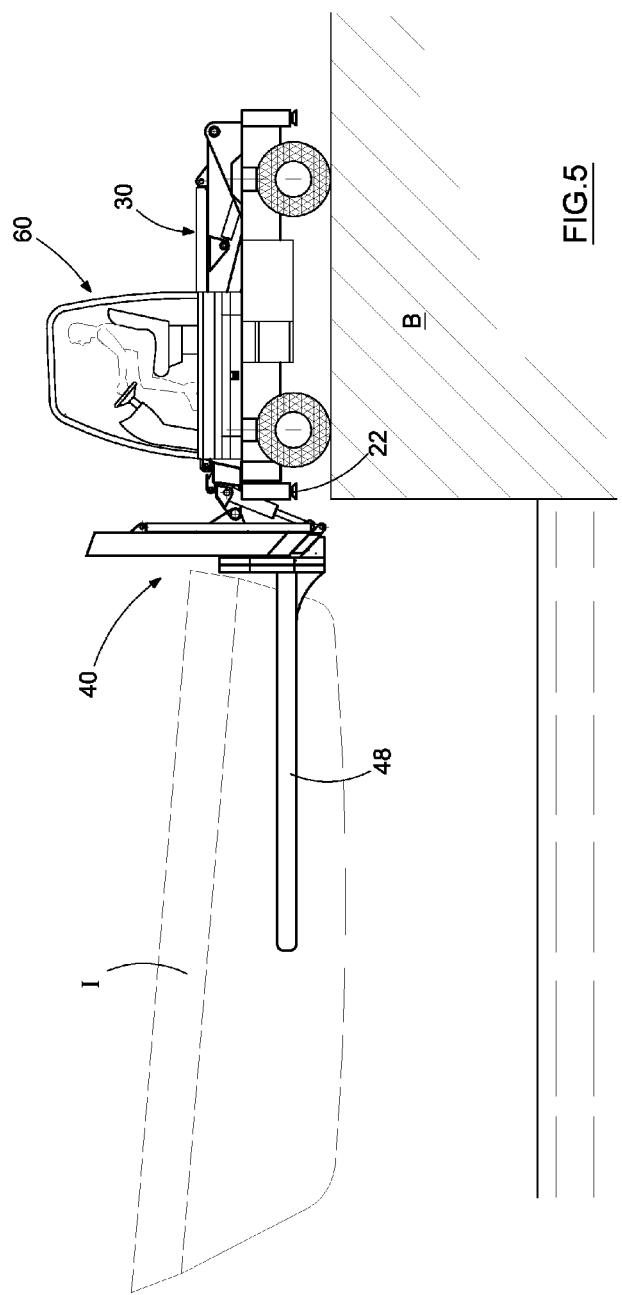

In FIG. 5 the boat I has been lifted to the pier level B by retracting the tubular lift members of the lift assembly 40. The fore stabilizers 22 have been retracted and the operator cab 60 has been lowered so that the truck is in the driving state. It has to be noted that while the boat is being lifted the center of gravity of the telescopic boom 30 is backwards placed and this do not happens in background art trucks in which all the lift assembly and its support members are moved to the front end of the truck. The above means that, for a same global size and weight, the truck of the present invention has a greater loading capacity.

Figure 6:
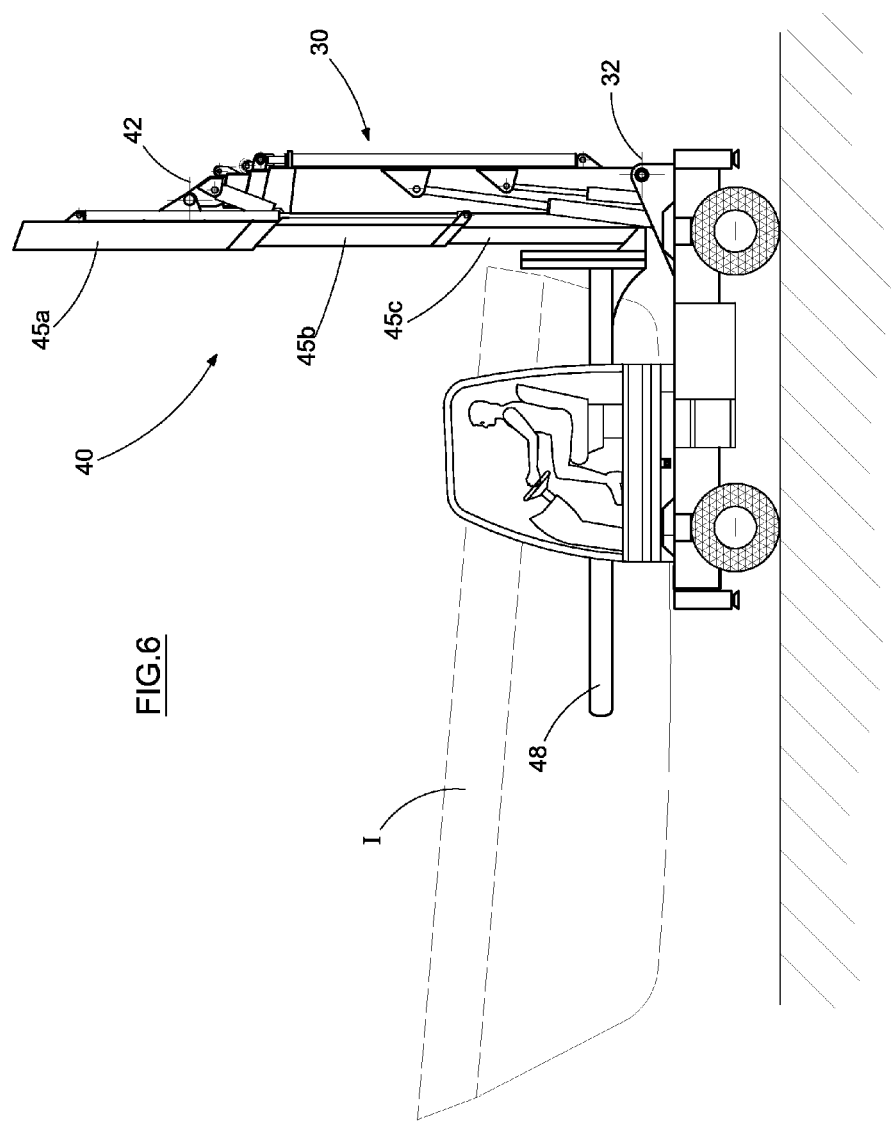

The boat can be transported to the storage racks with the truck either in the state of FIG. 5 or in the state of FIG. 6. The choice between the above states is made as a function of the global weight and size of the boat and of the position of its center of gravity. In the state of FIG. 6 the telescopic boom 30 is vertical and the lift assembly is downwards extended so that the boat hangs just over the truck frame. This state is obtained by rotating the telescopic boom around the axis 31 a also rotating, at the same time and in a coordinate way, the lift assembly around the axis 41 so that the forks remain horizontal during the movement. When the telescopic boom 30 has reached the vertical position the tubular lift members 45*b* and 45*c* are extended downwards. The above means that necessarily, due to the geometry of the kinematic mechanism that is to the fact that the lift assembly is pivotably connected to the telescopic boom 30, in the state of FIG. 6 the portion of lift assembly comprising the tubular lift members 45*a*, 45*b*, 45*c* which form a straight telescopic structure is substantially vertical and parallel to the telescopic boom 30 which is a straight structure too.

In the state of FIG. 6 the center of gravity of the telescopic boom 30 is at the rear end of the truck and the center of gravity of the boat is much more backwards arranged with respect to the state of FIG. 5, and in many case it is located between the axis of the fore wheels and the axis of the rear wheels so that the truck has a much greater loading capacity and total length which is a just a little greater then the length of the boat.

Figure 7:
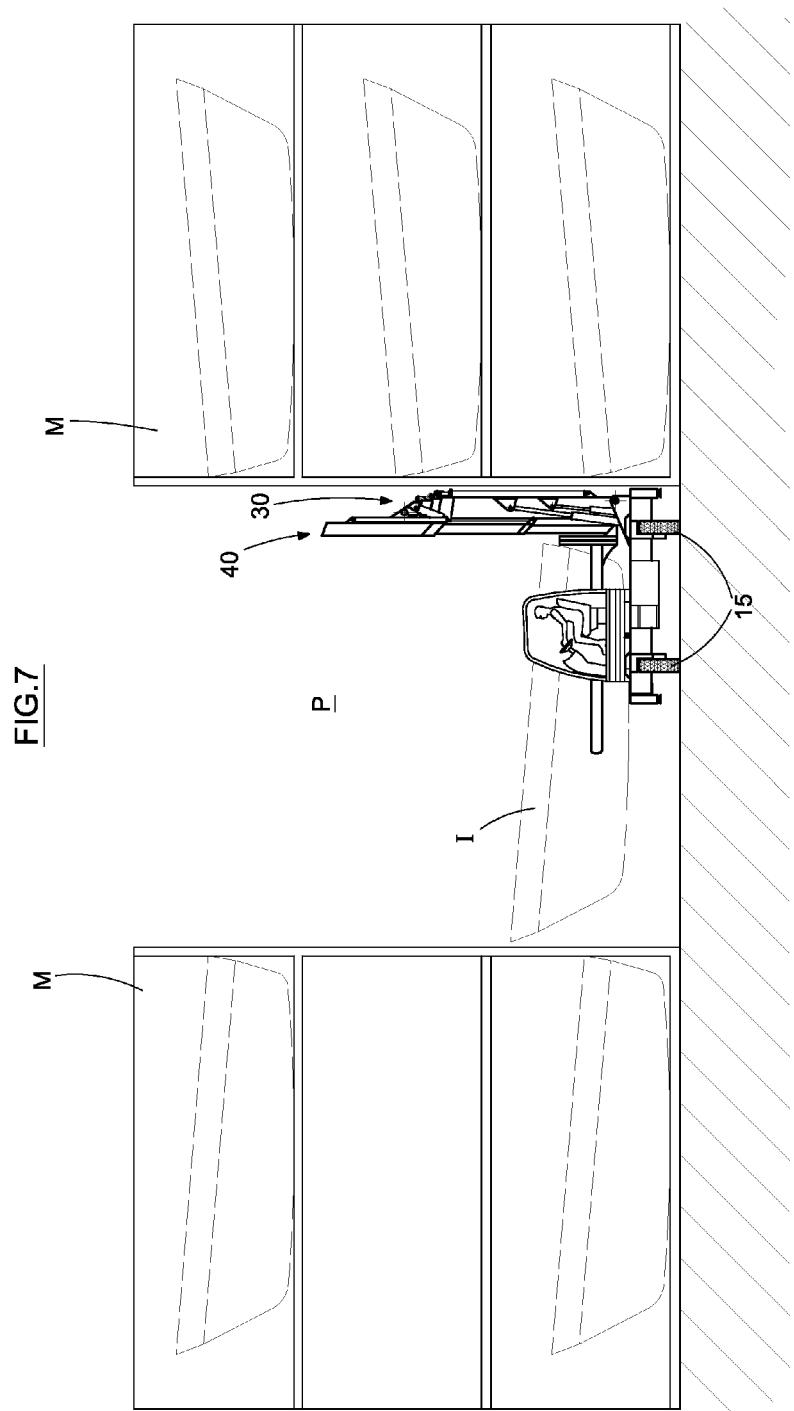
Figure 8:
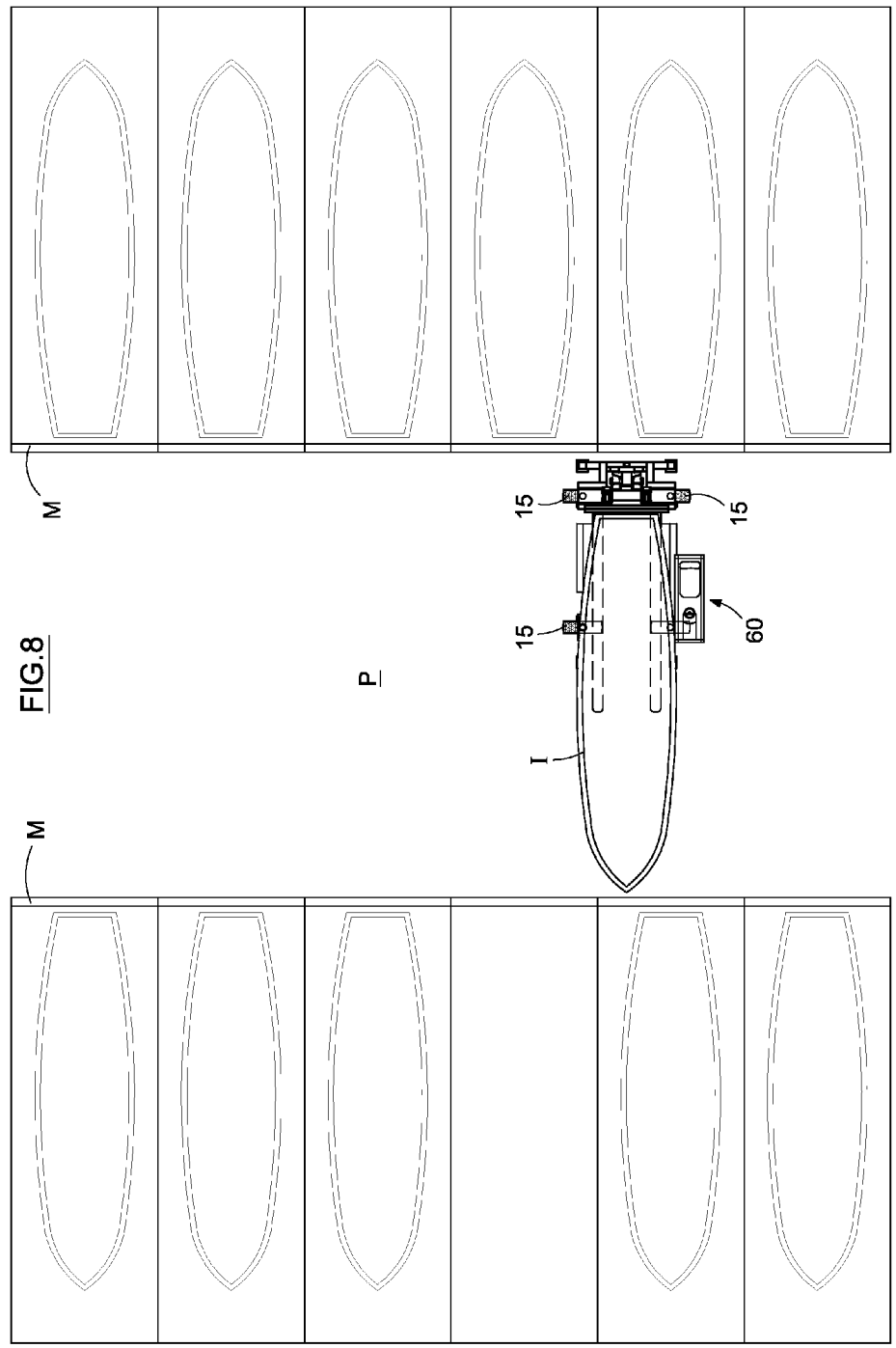

FIGS. 7 and 8 respectively show a side view and a top view the truck while it is entering the passage, P, between two facing storage racks, M. The state of the truck in this step is still the one of FIG. 6 except for the position of the wheels 15 which are all steered of 90° so that the truck laterally enters and moves inside the passage P. This ability of the truck, which however also belong to some truck of the background art, allows minimizing the width of the passage P which can be reduced to about the maximum length of the boat to be stores summed to the width of the telescopic boom 30 and the lift assembly supporting structure (without the forks).

Figure 9:
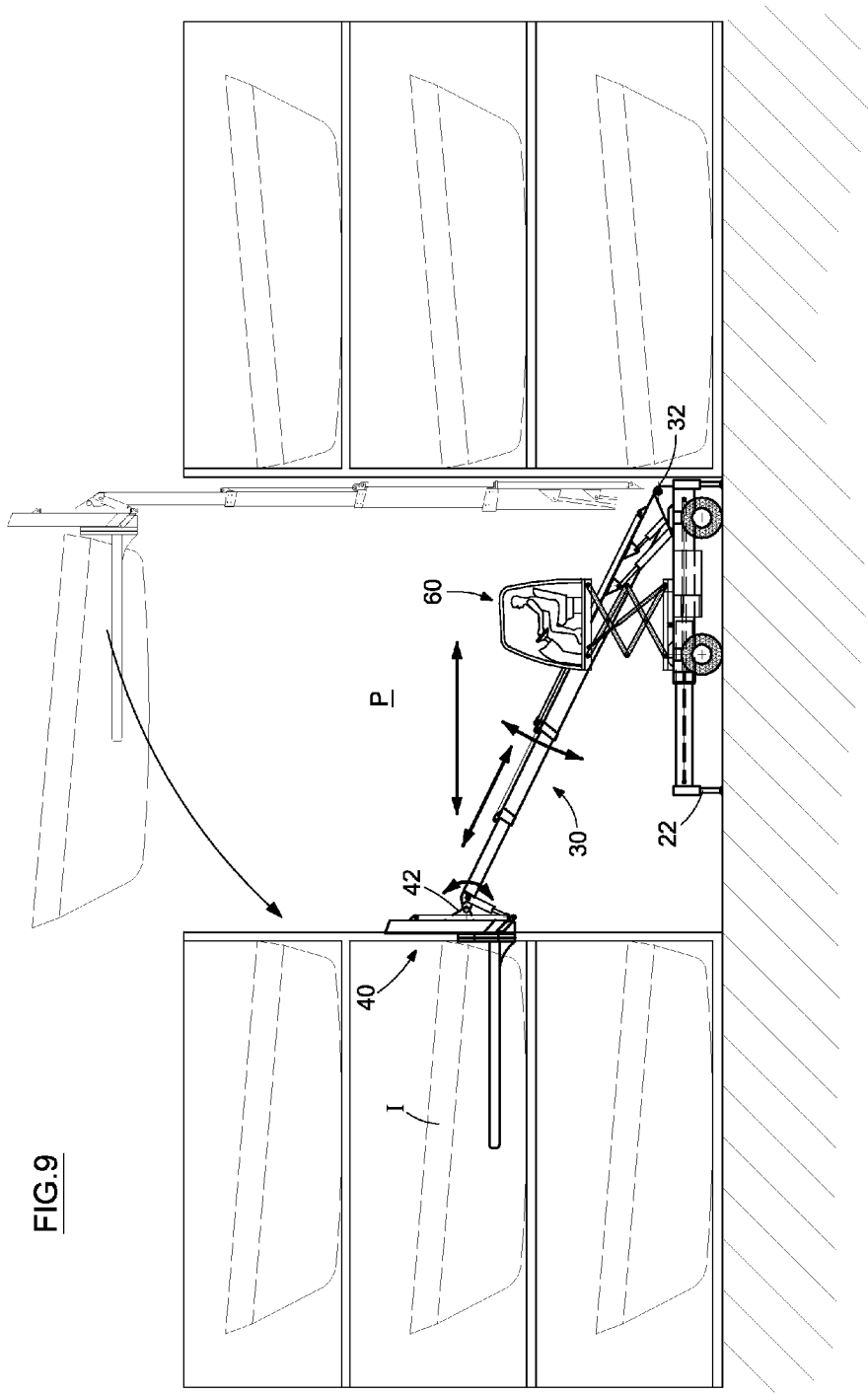

In FIG. 9 it is shown the step of introducing the boat in a rack cell, in this embodiment a cell at the second level from the bottom. The fore stabilizers 22 are extended to the maximum extent and then lowered together with the rear stabilizers 21. The rotation movement of the telescopic boom 30 around the axis 31, the translation movement fro extending/retracting the tubular members of the telescopic boom 30 and the rotation movement of the lift assembly around the axis 41 are coordinated in order to keep the forks substantially horizontal and also in order the obtain a substantially horizontal translation of the forks which allow to correctly inserting the boat in the cell without bumping other boats or the frame of the storage rack. Preferably, the above movements are coordinated thanks to means apt to set a relation between said movements which are composed mainly of electronic components adapted to verify the absolute and/or relative position of the various mechanical members of the kinematic mechanism, said electronic components being also useful to control the movements of some of said mechanical members as a function of the movement of position of other mechanical members. For instance, once the boat has been lifted to the desired height by upwards extending the telescopic boom the operator could set an automatic horizontal transfer mode during which the electronic components coordinate the above described movements in order to obtain an horizontal movement of the forks with the forks remaining in a horizontally extending arrangement. In addiction, also the extension/retraction movement of the tubular lift members 43 can be coordinated together with the other movements, and it may be useful, for instance for obtaining the horizontal transfer of the forks directly from state shown in FIGS. 6 and 7. Still in FIG. 9 it is shown with thin line the telescopic boom 30 vertically arranged and completely extended and it can be noted that the length of the telescopic boom allows inserting the boat at the highest level of the storage rack M. It is also to be noted that the operator cab can be lifted at the desired height so that the operator has a good view during the stacking operation. Finally, it has also to be outlined that even during the movements of the operation of stacking the boat in the rack cell, the center of gravity of the telescopic boom remains substantially a more backwards directed position with respect the longitudinally sliding lift assembly which is typical of the trucks of the background art and it means that the truck of the present invention has a greater loading capacity. The loading capacity is further increased by the presence of the extensible fore stabilizers which allows forward moving the fulcrum of the mass forces to be equilibrated.

Obviously, the above described steps will be performed in reverse order when a boat has to be picked from a rack cell and transferred into the water.

Figure 10:
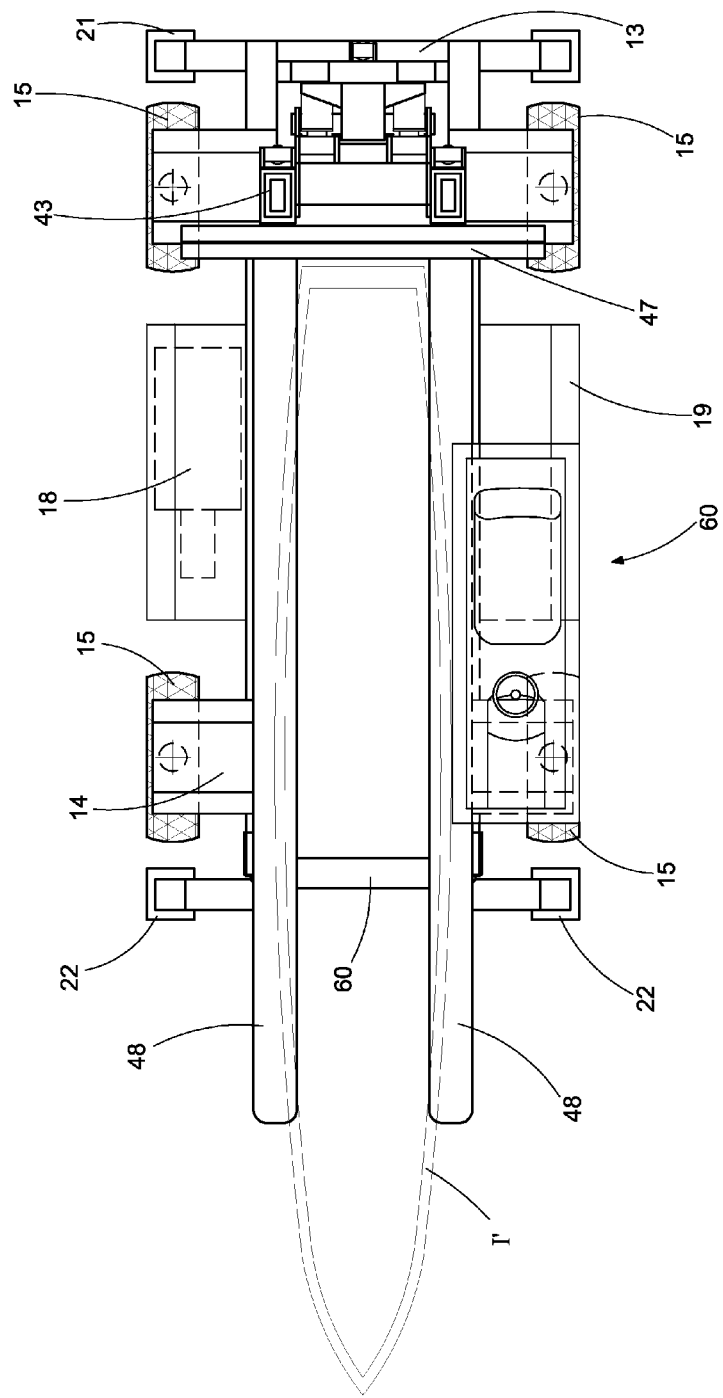

FIG. 10 shows a top view of the truck of the present invention in a state which is similar to the driving state shown in FIG. 6. In this last state the operator cab 60 is transversally arranged within the global width of the truck since the transported boat, I', is smaller a and the cab do not need to be outward translated. In this state the overall plant dimensions of the truck are further reduced. This state can be also used for driving the truck when there is no boat onboard. In general, for a same loading capacity the overall plant dimension of the truck of the present invention are lower than the ones of the background art trucks and the truck of the present invention is also more versatile as it can be used for transporting and stacking a wider range of boats, and it is also has a greater manoeuvrability when it has no boats onboard.

Certainly, the advantages of the above described lift truck, in particular for boats, remain safe also in case of modifications or when different embodiments are adopted within the subject matter of the present invention.

In particular, the self-propelled main frame 10, the telescopic boom 30, and the lift assembly 40 could be formed with structural members even much different to what above disclosed and represented in figures, and they are obviously designed to give such structures suitable mechanical properties mainly as regards their loading capacity and bending strength. All the hydraulic actuators and the transmission means could be replaced by other components having the same function. The operator cab 60, as well as other mechanical assemblies such as the internal combustion engine 18 and the hydraulic power system 19 could be arranged in different positions. Some components of the truck, such as the extensible fore stabilizers, or the 90° steering system of the wheels and the operator cab moving system could also be not provided in simpler versions of the truck, and the truck could be provided with further minor features not present in the disclosed embodiment. The forks 48 could be replaced by different boat supporting members. The electronic components apt to set a relation between the various movements of the telescopic boom 30 and the lift assembly 40 could be replaced, completely or in part, by equivalent means which could be, for instance, mechanical transmission members. Finally, the figures which represents a specific embodiment of the present invention are schematic and they just show the mechanical structure of the truck which is useful for comprehending the invention, and they do not represent, nor a description is given, the other components that necessarily complete a lift truck such as a braking system, mechanical transmissions, an electric systems, control systems and even more components together with their housing and chassis.

These and more changes or modifications could be carried out to the lift truck of the present invention still remaining within the ambit of protection defined by the following claims.

The invention claimed is:

1. A lift truck for lifting and stacking boats, comprising:
   a self-propelled main frame with wheels;
   a telescopic boom pivotably connected close to a rear end of said main frame, said telescopic boom being pivotable around a pivot axis which is a substantially horizontal cross-axis with regard to a for-and-aft direction of said truck, said telescopic boom rotating from a substantially horizontal laying arrangement to a substantially upright arrangement in which a center of gravity of said telescopic boom is at the rear end of said truck;
   a lift assembly comprising a pair of lift forks bound to a telescopic frame for supporting said pair of forks, said telescopic frame being pivotably connected at the end of said telescopic boom, said lift assembly pivoting around a pivot axis which is a substantially horizontal cross-axis with regard to a for-and-aft direction of said truck, so that when the telescopic boom has reached a vertical position, a portion of the lift assembly which forms a straight telescopic structure is substantially vertical and parallel to the telescopic boom, with said portion being adapted to be extended downwards; and
   a connection/control system operable to set a relation between the pivoting of said lift assembly around said pivot axis thereof and the pivoting of said telescopic boom around said pivot axis thereof, for keeping said pair of lift forks in a substantially horizontally extending arrangement during said pivoting.

2. The lift truck according to claim 1, further comprising:
   an operator cab mounted on said main frame in an external position with regard to the transversal overall dimensions in plant of said main frame.

3. The lift truck according to claim 2, wherein said operator cab is provided with a mechanism for transversally moving it with regard to a for-and-aft direction of said truck, from a retracted position in which said operator cab remains within the overall dimensions of said truck in plant and an external position transversally projecting off said truck of a definite amount.

4. The lift truck according to claim 1, wherein said main frame is provided with stabilizers operable to contact the ground.

5. The lift truck according to claim 4, wherein at least one of said stabilizers is forwardly extensible up to a definite distance from a front end of said main frame.

6. The lift truck according to claim 1, wherein said connection/control system is operable to set a relation between the pivoting of said telescopic boom around said pivot axis thereof and an extension/retraction movement of said telescopic boom.

7. The lift truck according to claim 1, wherein said connection/control system is operable to set a relation between the pivoting of said telescopic boom around said pivot axis thereof and an extension/retraction movement of said lift assembly.

8. The lift truck according to claim 1, wherein said connection/control system further comprises at least one between electronic control system for controlling said pivoting and an extension/retraction movement and mechanical transmission system.

9. A lift truck for lifting and stacking boats, comprising:
   a self-propelled main frame with wheels;
   a telescopic boom pivotably connected close to a rear end of said main frame, said telescopic boom being pivotable around a pivot axis which is a substantially horizontal cross-axis with regard to a for-and-aft direction of said truck, said telescopic boom rotating from a substantially horizontal laying arrangement to a substantially upright arrangement in which a center of gravity of said telescopic boom is at the rear end of said truck;
   a lift assembly comprising a pair of lift forks bound to a telescopic frame for supporting said pair of forks, said telescopic frame being pivotably connected at the end of said telescopic boom, said lift assembly pivoting around a pivot axis which is a substantially horizontal cross-axis with regard to a for-and-aft direction of said truck, so that when the telescopic boom has reached a vertical position, a portion of the lift assembly that forms a straight telescopic structure is substantially vertical and parallel to the telescopic boom, with said portion being adapted to be extended downwards, while said pair of forks remain horizontal so that a boat hangs over the truck frame; and
   a connection/control system operable to set a relation between the pivoting of said lift assembly around said pivot axis thereof and the pivoting of said telescopic boom around said pivot axis thereof, for keeping said pair of lift forks in a substantially horizontally extending arrangement during said pivoting.

* * * * *